United States Patent
Chowdhury et al.

(10) Patent No.: US 7,586,670 B2
(45) Date of Patent: Sep. 8, 2009

(54) NONLINEAR OPTICAL DEVICES BASED ON METAMATERIALS

(75) Inventors: Aref Chowdhury, Berkeley Heights, NJ (US); John A. Tataronis, Santa Fe, NM (US)

(73) Assignee: Alcatel-Lucent USA Inc., Murray Hill, NJ (US)

(*) Notice: Subject to any disclaimer, the term of this patent is extended or adjusted under 35 U.S.C. 154(b) by 68 days.

(21) Appl. No.: 11/432,803

(22) Filed: May 13, 2006

(65) Prior Publication Data

US 2007/0263278 A1     Nov. 15, 2007

(51) Int. Cl.
    *G02F 1/35*       (2006.01)
    *G02F 2/02*       (2006.01)

(52) U.S. Cl. .................................. 359/332; 359/326

(58) Field of Classification Search .............. 372/72, 372/22; 359/332, 326; 398/157
See application file for complete search history.

(56) References Cited

U.S. PATENT DOCUMENTS

| | | | | |
|---|---|---|---|---|
| 4,775,215 | A * | 10/1988 | Teng et al. | 385/143 |
| 6,493,478 | B1 * | 12/2002 | DeRosa et al. | 385/16 |
| 2001/0028769 | A1 * | 10/2001 | Deacon | 385/50 |
| 2005/0141893 | A1 * | 6/2005 | Shih et al. | 398/82 |
| 2005/0206997 | A1 * | 9/2005 | Hubbard | 359/330 |
| 2007/0041733 | A1 * | 2/2007 | Chowdhury | 398/152 |

OTHER PUBLICATIONS

A.K. Popov, et al, "Negative-index metamaterials: second-harmonic generation, Manley-Rowe relations land parametric amplification", Applied Physics B; Lasers and Optics, Springer-Verlag, BE, vol. 84, No. L1-2, Mar. 18, 2006, pp. 131-137.*

A. Chowdhury, et al., "Nonlinear wave mixing and susceptibility properties of negative refractive index materials", Physical Review E 75, 016603 (2007), pp. 016603-1-016603-5.

Shalaev, V.M. et al., "Negative index of refraction in optical metamaterials," Optics Letters, vol. 30, No. 24, pp. 3356-3358, Dec. 15, 2005.

Pare, C. et al., "Compensating for dispersion and the nonlinear Kerr effect without phase conjugation," Optics Letters, vol. 21, No. 7, pp. 459-461, Apr. 1, 1999.

Fejer, M.M. et al., "Quasi-Phase-Matched Second Harmonic Generation: Tuning and Tolerances," IEEE Journal of Quantum Electronics, vol. 28, No. 11, pp. 2631-2654, Nov. 1992.

Feise, M.W. et al., "Tunable transmission and bistability in left-handed band-gap structures," Applied Physics Letters, vol. 85, No. 9, pp. 1451-1453, Aug. 30, 2004.

(Continued)

*Primary Examiner*—Minsun Harvey
*Assistant Examiner*—Patrick Stafford
(74) *Attorney, Agent, or Firm*—John F. McCabe

(57) ABSTRACT

An apparatus includes one or more optical couplers, an optical medium, and an optical pump source. The optical medium behaves as a negative refractive index material over a frequency range. The one or more optical couplers are configured to provide first and second optical inputs to the optical medium and to provide an optical output from the optical medium. The optical pump source is coupled by one of the one or more optical couplers to deliver pump light to the optical medium.

14 Claims, 15 Drawing Sheets

OTHER PUBLICATIONS

Zharov, A.A. et al., "Nonlinear Properties of Left-Handed Metamaterials," *Physical Review Letters*, vol. 91, No. 3, pp. 037401-1 to 037401-4, Jul. 18, 2003.

Mollenauer, L.F. et al., "Experimental Observation of Picosecond Pulse Narrowing and Solitons in Optical Fibers," *Physical Review Letters*, vol. 45, No. 13, pp. 1095-1098, Sep. 29, 1980.

Kozyrev, A.B. et al., "Wave propagation in nonlinear left-handed transmission line media," *Applied Physics Letters*, vol. 87, pp. 121109-1 to 121109-3, American Institute of Physics, 2005.

A.K. Popov, et al, "Negative-index metamaterials: second-harmonic generation, Manley-Rowe relations and parametric amplification", *Applied Physics B; Lasers and Optics*, Springer-Verlag, BE, vol. 84, No. 1-2, Mar. 18, 2006, pp. 131-137.

C. Paré, et al, "Compensating for dispersion and the nonlinear Kerr effect without phase conjugation" *Optics Letters, Optical Society of America*, Washington DC, US, vol. 21, No. 7, Apr. 1996, pp. 459-461.

H. Ishikawa, et al, "Wavelength Conversion Technologies For Photonic Network Systems", *Fujitsu-Scientific and Technical Journal, Fujitsu Limited*. Kawasaki, JP, vol. 35, No. 1, Jul. 1999, pp. 126-138.

PCT International Search Report dated Oct. 29, 2007 (PCT/US2007/011515) 4 pages.

* cited by examiner

NONLINEAR OPTICAL DEVICES BASED ON METAMATERIALS

BACKGROUND

1. Technical Field

The invention relates to optical components and optical data communications.

2. Discussion of the Related Art

This section introduces aspects that may be helpful to facilitating a better understanding of the inventions. Accordingly, the statements of this section are to be read in this light and are not to be understood as admissions about what is in the prior art or what is not in the prior art.

Nonlinear optical effects are the source of both benefits and undesired effects in the area of optical data communications. With respect to their benefits, nonlinear optical effects enable, e.g., the wavelength-conversion of a stream of optical data. In some wavelength division multiplexed (WDM) networks, wavelength-conversion may be used to more efficiently use available bandwidth. With respect to their undesired effects, nonlinear optical effects can distort optical data signals. In an ultra-long-haul optical transmission line, such undesired distortion of the optical data signals may limit the maximum reach of the optical transmission line.

Recently, a construction has been proposed for an artificial optical medium whose refractive index is negative at optical fiber communication wavelengths. The construction may provide an optical medium with a negative refractive index at wavelengths between about 1.3 micrometers ($\mu m$) and about 1.6 $\mu m$. From this artificial optical medium, it may be possible to make optical devices with useful refractive and/or diffractive properties.

Herein, a medium that has a negative refractive index in some wavelength range is referred to as a metamaterial.

BRIEF SUMMARY

The inventors have realized that some metamaterials have nonlinear optical properties that may be exploited in beneficial manners. In various ones of the embodiments, nonlinear optical properties of metamaterials are exploited to advantageously process light.

In a first aspect, an apparatus includes an optical medium, one or more optical couplers, and an optical pump source. The optical medium behaves as a negative refractive index material over a frequency range. The one or more optical couplers are configured to provide first and second optical inputs to the optical medium and to provide an optical output from the optical medium. The optical pump source is coupled by one of the one or more optical couplers to deliver pump light to the optical medium.

In a second aspect, a method includes at a carrier frequency, transmitting a stream of optical data signals over multiple optical fiber spans of an optical fiber transmission line and sending the transmitted optical data signals into an optical medium while optically pumping the optical medium. The optical medium has a third-order nonlinear electrical susceptibility that is negative for some set of frequency arguments. The optical medium has a negative refractive index over a wavelength range.

In a third aspect, a method includes at a preselected frequency, transmitting light to an optical medium and pumping the optical medium while performing the transmitting to wavelength-convert part of the transmitted light in the optical medium. The optical medium has a negative refractive index in some wavelength range.

BRIEF DESCRIPTION OF THE DRAWINGS

In the Figures and text, like reference numerals indicate elements with similar functions.

Figure 1A:
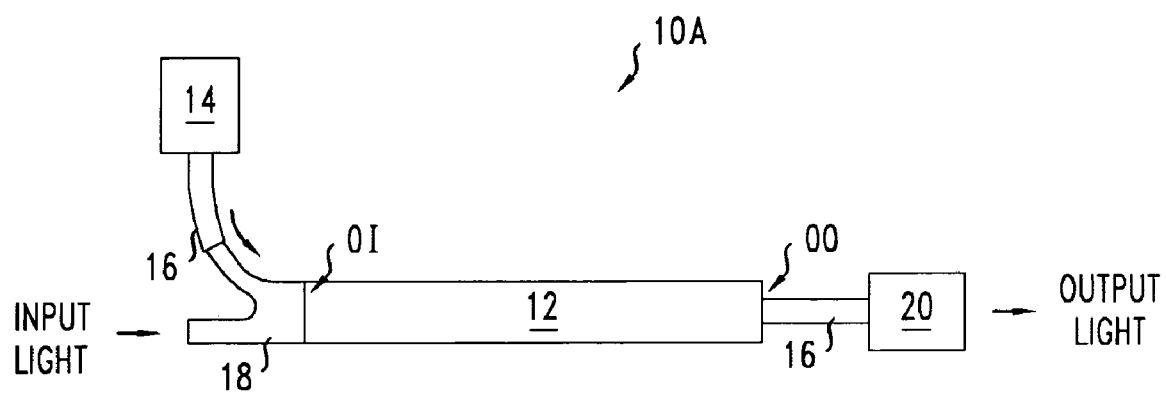
FIGS. 1A-1D are block diagrams that illustrate alternate embodiments of optical wavelength-converters.
Figure 1B:
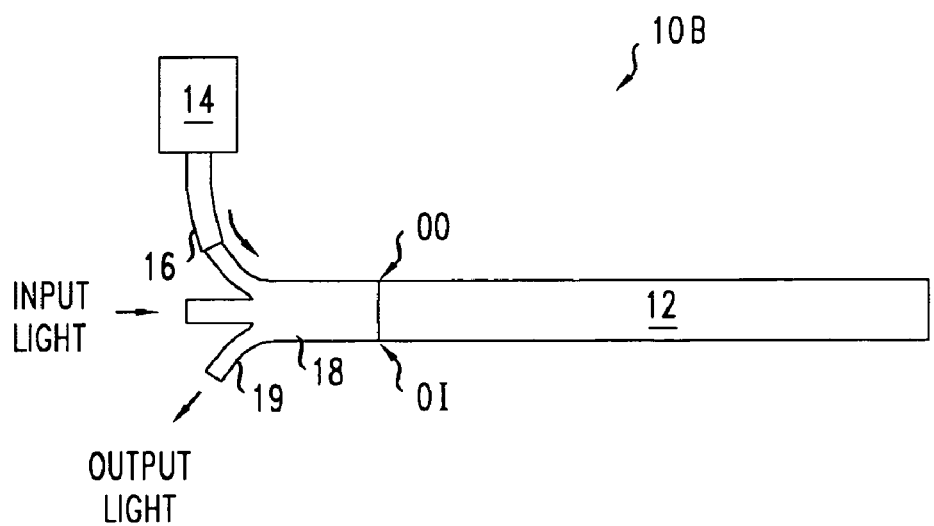
Figure 1C:
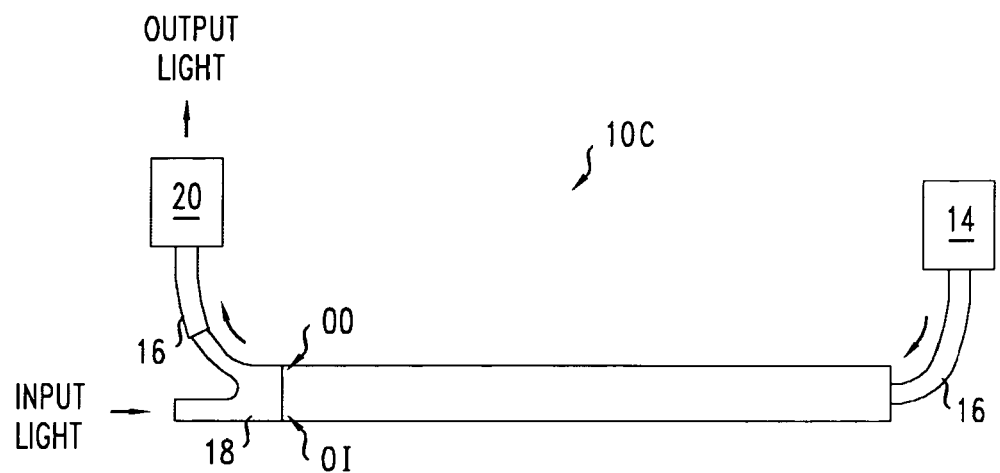
Figure 1D:
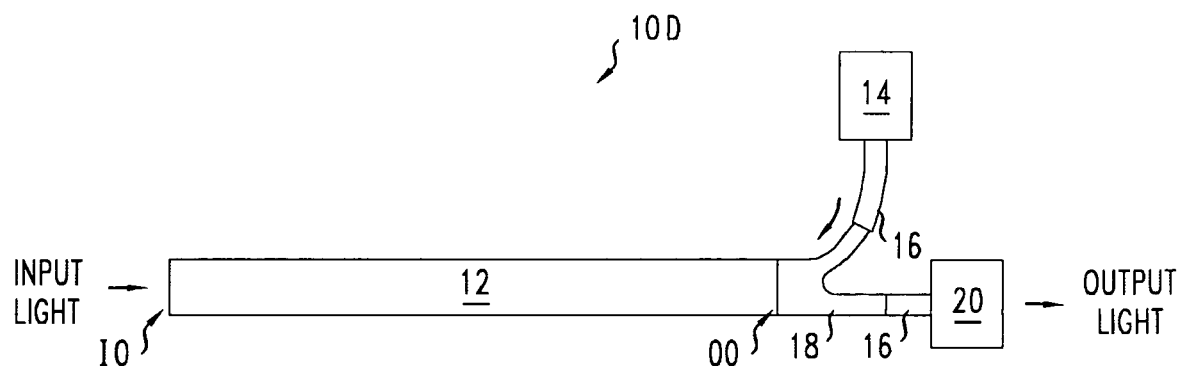

In the Figures, relative dimensions of some features may be exaggerated to more clearly show one or more of the structures being illustrated.

Herein, various embodiments are described more fully by the Figures and the Detailed Description of Illustrative Embodiments. Nevertheless, the inventions may be embodied in various forms and are not limited to the embodiments described in the Figures and Detailed Description of Illustrative Embodiments.

DETAILED DESCRIPTION OF ILLUSTRATIVE EMBODIMENTS

1. Optical Wavelength-Conversion

With respect to exploiting nonlinear optical properties of metamaterials, some embodiments provide optical wavelength-converters that are based on metamaterials. Various geometries for optical wavelength-converters 10A-10D are illustrated in FIGS. 1A-1D. The optical wavelength-converters 10A-10D differ in relative directions of input light, pump light and/or wavelength-converted light in their optical conversion media 12.

Referring to FIGS. 1A-1D, the optical wavelength-converters 10A-10D include an optical conversion medium or waveguide 12, an optical pump source 14, one or more ordinary optical waveguides 16, a 2×1 or 3×1 optical coupler 18, and optionally an optical filter 20.

The optical conversion medium or waveguide 12 is a metamaterial for light at a frequency of one or more of the light to be wavelength-converted, the pump light, and the wavelength-converted light. The optical conversion medium or waveguide 12 has an optical input (OI) for receiving the light to be wavelength converted and an optical output (OO) for sending out the wavelength-converted light. The optical conversion medium or waveguide 12 may be in an optical waveguide, e.g., may be the optical core and/or optical cladding of such an optical conversion waveguide, e.g., in a geometry for a planar optical waveguide. Alternatively, the optical conversion medium or waveguide 12 may simply be an optical medium having one or more ports for inputting collimated beams of the pump light and the light to be wavelength-converted therein and having a port for outputting a beam of the wavelength-converted light there from. The various light beams propagate collinearly or anti-collinearly in such an optical medium.

The optical wavelength-converters 10A and 10D have their optical input and optical output at or near opposite ends of the optical conversion medium 12 or optical conversion waveguide 12. In the optical wavelength-converter 10A, the input, pump, and wavelength-converted light co-propagate in the optical conversion medium 12 or optical conversion waveguide 12. In the optical wavelength-converter 10D, the input and wavelength-converted light co-propagate in the optical conversion medium 12 or optical conversion waveguide 12, and the pump light counter propagates with respect to the input and pump light in the optical conversion medium 12 or optical conversion waveguide 12.

The optical wavelength-converters 10B and 10C have their optical inputs and optical outputs at or near the same end of the optical conversion medium 12 or optical conversion waveguide 12. In the optical wavelength-converter 10B, the input and pump light co-propagate in the optical conversion medium 12 or optical conversion waveguide 12, and the wavelength-converted light counter propagates with respect to the input and pump light in the optical conversion medium 12 or optical conversion waveguide 12. In the optical wavelength-converter 10C, the pump and wavelength-converted light co-propagate in the optical conversion medium 12 or optical conversion waveguide 12, and the input light counter propagates with respect to the wavelength-converted and pump light in the optical conversion medium 12 or optical conversion waveguide 12.

The optical pump source 14 produces pump light that causes wavelength-conversion of the received input light via a nonlinear optical process in the optical conversion medium 12 or optical conversion waveguide 12. Exemplary optical pump sources 14 may include lasers that are tunable over wavelength ranges of infrared light or visible light.

In the wavelength-converters 10A-10B, the 2×1 and 3×1 optical couplers 18 have one optical port that functions as an optical input for the light to be wavelength-converted and another optical port that functions as an optical input for the pump light. An optical waveguide 16 such as a silica glass optical fiber and/or planar optical waveguide delivers the pump light to the 2×1 or 3×1 optical coupler 18. The 2×1 and 3×1 optical couplers 18 also deliver the received input and pump light to a third optical port. The third optical port connects to the optical input of the optical conversion medium 12 or optical conversion waveguide 12. Exemplary 2×1 and 3×1 optical connectors 18 may be fabricated as planar integrated devices or optical fiber devices by methods well known to those of skill in the art.

In the wavelength-converter 10A, an ordinary optical waveguide 16 functions as an optical coupler whose optical output connects the optical filter 20 and whose optical input receives light from the optical output of the optical conversion medium 12 or optical conversion waveguide 12. Here, the optical filter 20 significantly attenuates light at the pump wavelength and/or the input wavelength and transmits light at the converted-wavelength so that the optical wavelength-converter 10A substantially only outputs light at the converted-wavelength. In this embodiment, exemplary 2×1 optical connectors 18 may be fabricated as planar integrated devices or optical fiber devices by methods well known to those of skill in the art.

In the wavelength-converter 10B, the optical conversion medium 12 or optical conversion waveguide 12 transmits the wavelength-converted light to the 3×1 optical coupler 18. Some of the wavelength-converted light is then, output at the fourth port 19, i.e., an optical output, of the 3×1 optical coupler 18. In this embodiment, exemplary 3×1 optical connectors 18 may be fabricated as planar integrated devices or optical fiber devices by methods well known to those of skill in the art.

In the wavelength-converter 10C, the 2×1 optical coupler 18 has a first optical port that receives input light for wavelength-conversion and has a second optical input that transmits part or all of the received input light to the optical conversion medium 12 or optical conversion waveguide 12 connected to the second optical port. The second optical port of the 2×1 optical coupler 18 also receives wavelength-converted light and pump light from the optical conversion medium 12 or optical conversion waveguide 12 and outputs part or all of said received light to an ordinary optical waveguide 16 that is connected to the optical filter 20. Here, the optical filter 20 significantly attenuates light at the pump wavelength and transmits light substantially only at the converted-wavelength so that the optical wavelength-converter 10C substantially only outputs light at the converted-wavelength. The optical waveguide 16 may be a silica glass optical fiber and/or silica glass, planar, optical waveguide. In this embodiment, exemplary 2×1 optical connectors 18 may be fabricated as planar integrated devices, optical fiber devices, or optical circulators by methods well known to those of skill in the art.

In the wavelength-converter 10D, the 2×1 optical coupler 18 has a first optical port that receives input and wavelength-converted light from the optical conversion medium 12 or optical conversion waveguide 12 and outputs all or part of said received light to a second optical port. The second optical port is connected to the optical filter 20 via an ordinary optical waveguide 16. Here, the optical filter 20 significantly attenuates light at the input wavelength and transmits light at the converted-wavelength so that the optical wavelength-converter 10D substantially only outputs light at the converted-wavelength. The 2×1 optical coupler also includes a third optical port that receives light from the pump source 14 via a silica glass, planar or fiber optical waveguide 16 and inputs all or part of the received pump light to the optical conversion medium or optical conversion waveguide 12. In this embodiment, exemplary 2×1 optical couplers 18 may be fabricated as planar integrated devices, optical fiber devices, or optical circulators by methods well known to those of skill in the art.

In embodiments including the optional optical filter 20, the optical filter 20 significantly attenuates light at the pump wavelength and/or the input wavelength so that the wavelength-converters 10A, 10C, 10D output substantial light only at the converted-wavelength. Exemplary optical filters 20 may include band pass, low pass, or high pass optical filters whose construction would be readily understood to those of skill in the art.

In the optical wavelength-converters 10A-10D, the optical conversion medium 12 or optical conversion waveguide 12 produces wavelength-conversions via a nonlinear optical process involving three photons. In particular, the wavelength-conversion results from a process that substantially satisfies the ordinary momentum and energy conservation relations:

$$k_3 = k_1 + k_2 \text{ and } \omega_3(k_3) = \omega_1(k_1) + \omega_2(k_2). \tag{1}$$

Here, $k_1$, $k_2$, and $k_3$ are the momenta of the input light, the pump light, and the wavelength-converted light, respectively, in the optical conversion medium 12 or optical conversion waveguide 12. Also, $\omega_1(k_1)$, $\omega_2(k_2)$, and $\omega_3(k_3)$ are the frequencies of the input light, the pump light, and the wavelength-converted light, respectively, in the optical conversion medium or waveguide 12. The ordinary energy and momentum conservation relations of (1) provide for perfect phase matching, i.e., of the momenta of the input, pump, and wavelength-converted light in the optical conversion medium or waveguide 12.

In many optical media, the momentum of light is not strictly proportional to the frequency. For that reason, both conservation relations of (1) often cannot be satisfied simultaneously in such optical media. Even when the ordinary momentum conservation relation of (1) cannot be satisfied, wavelength-conversion may still be available via a quasi-phase matching relation for the momenta of the input, pump, and wavelength-converted light. In wavelength-conversion based on quasi-phase matching, the optical medium is regularly modulated along the propagation direction of the light therein.

In contrast, the optical conversion medium or waveguide 12 is typically a substantially homogeneous medium along the propagation direction at the wavelengths of the interacting light so that the perfect or ordinary momentum and energy conservation relations of (1) are satisfied therein. The wavelength-conversion process in the optical conversion medium or waveguide 12 typically can support the conservation relations of (1), in part, because the optical conversion medium 12 is a metamaterial at one or more of the input, pump, and wavelength-converted frequencies, i.e., at one or more of the frequencies $\omega_1(k_1)$, $\omega_2(k_2)$, and $\omega_3(k_3)$. Furthermore, the frequencies $\omega_1(k_1)$, $\omega_2(k_2)$, and $\omega_3(k_3)$ are selected so that the optical conversion medium or waveguide 12, as appropriate, allows a solution to the ordinary conservation relations of (1) as discussed below.

In the wavelength-converters 10A and 10B, the optical media of the optical conversion medium 12 or optical conversion waveguide 12 are selected to satisfy the ordinary energy and momentum conservation relations of (1) for different relative directions of the input, pump, and wavelength-converted momenta $k_1$, $k_2$, and $k_3$. In various embodiments, $k_1$, $k_2$, and $k_3$ are collinear or anti-collinear in the optical conversion medium 12 or optical conversion waveguide 12.

Figure 2:
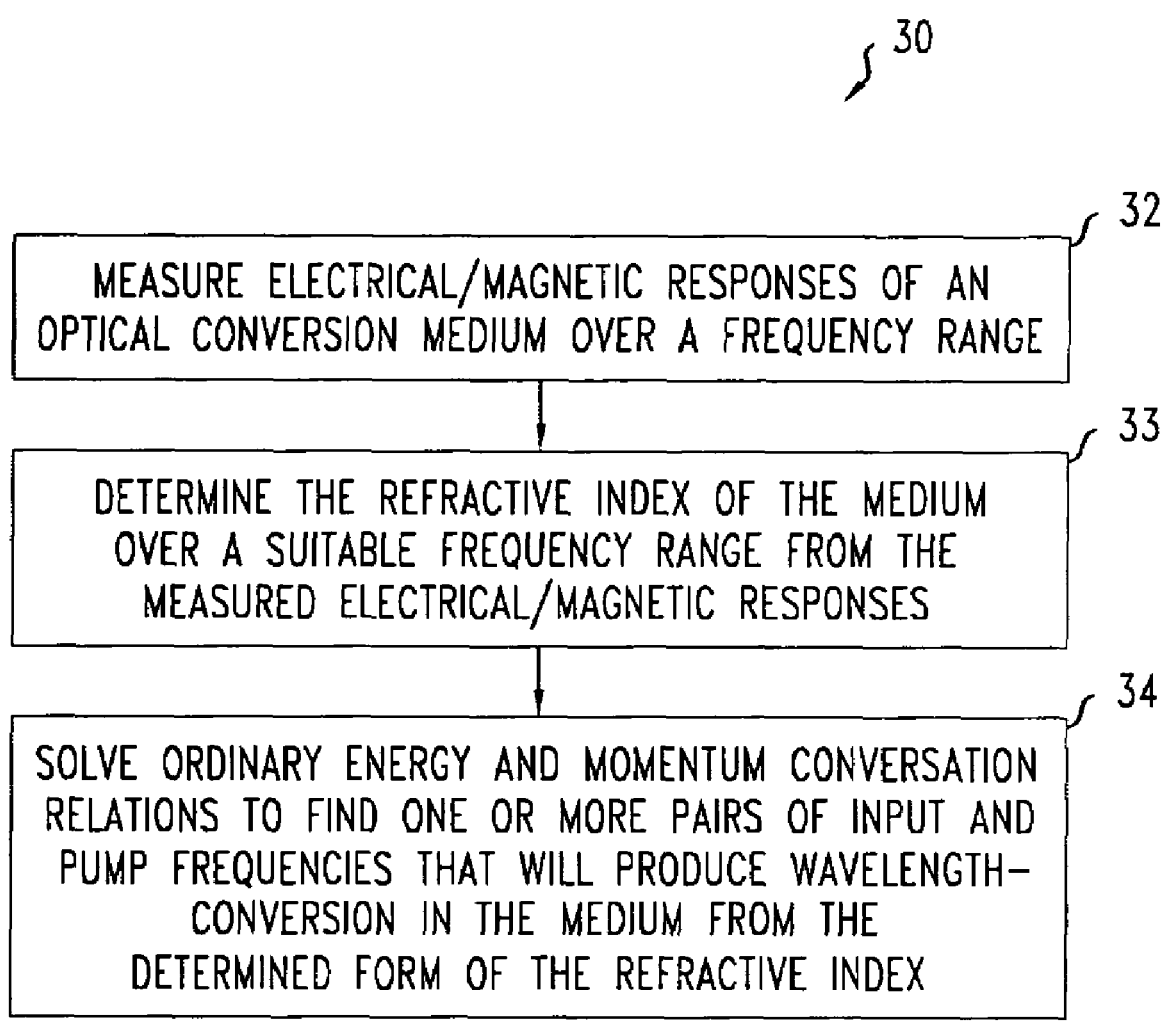
FIG. 2 is a flow chart illustrating a method of calibrating an optical wavelength converter, e.g., optical wavelength-converters of FIGS. 1A-1D.

FIG. 2 illustrates a method 30 of calibrating an optical wavelength converter, e.g., the optical wavelength-converters 10A-10D of FIGS. 1A-1D. In particular, the method 30 determines one or more input frequency—pump frequency pairs for which an optical conversion medium, e.g., the optical conversion media or waveguides 12, can collinearly or anti-collinearly produce wavelength-converted light while satisfying the ordinary energy and momentum conservation relations of (1).

The method 30 includes measuring electrical/magnetic responses of the optical conversion medium over an appropriate frequency range, e.g., the responses of the optical conversion media or waveguides 12 of FIGS. 1A-1D (step 32). The optical conversion medium is homogeneous along a direction of light propagation therein. The appropriate frequency range includes the resonant frequencies of the electric permittivity, $\in(\omega)$, and magnetic permeability, $\mu(\omega)$. For example, the measuring of these responses may involve measuring the resonant frequencies $\omega_o$ and $\Omega$ and the real characteristic frequencies $\omega_a$ and $\omega_b$ for the electric permittivity, $\in(\omega)$, and magnetic permeability, $\mu(\omega)$, respectively. Near the resonant frequencies, the electric permittivity, $\in(\omega)$, and magnetic permeability, $\mu(\omega)$, may be approximately described as:

$$\varepsilon(\omega) = \varepsilon_o \frac{(\omega^2 - \omega_a^2)}{(\omega^2 - \omega_o^2)} \text{ and } \mu(\omega) = \mu_o \frac{(\omega^2 - \omega_b^2)}{(\omega^2 - \Omega^2)}. \tag{2}$$

Techniques for measuring these resonant and characteristic frequencies of optical media are well known to those of skill in the art.

The method 30 includes determining the refractive index, $n(\omega)$, of the homogeneous optical conversion medium from the measured electrical/magnetic responses of the optical conversion medium (step 33). In particular, the determining step 33 evaluates the refractive index, $n(\omega)$, over an appropriate frequency range. Such a frequency range includes a first sub-range in which the optical conversion medium behaves as a negative refractive index optical medium, i.e., metamaterial, and a second sub-range in which the optical conversion medium behaves as a positive refractive index optical medium as discussed below. In the sub-range where the refractive index is negative, $\in(\omega)$ and $\mu(\omega)$ are simultaneously negative. In the sub-range where the refractive index is positive, $\in(\omega)$ and $\mu(\omega)$ are simultaneously positive. In both sub-ranges, the electric permittivity, $\in(\omega)$, and magnetic permeability, $\mu(\omega)$, may be approximately described by the relations of (2). Then, in both sub-ranges, the refractive index, $n(\omega)$, of the medium may be evaluated from the relation:

$$n(\omega) = \pm \sqrt{\frac{|(\omega^2 - \omega_a^2)(\omega^2 - \omega_b^2)|}{|(\omega^2 - \omega_o^2)(\omega^2 - \Omega^2)|}}. \tag{3}$$

In another frequency range, the refractive index, $n(\omega)$, of the optical conversion medium may be, e.g., imaginary so that light of said frequency range is absorbed in the optical conversion medium.

The method 30 includes solving ordinary momentum and energy conservation relations, e.g., the relations of (1), to find one or more pairs of input and pump frequencies that would be able to collinearly or anti-collinearly cause wavelength-conversion in the optical conversion medium (step 34). The solving step is based on the form of the refractive index, $n(\omega)$, as determined at step 33. For a medium whose refractive index, $n(\omega)$, satisfies above equation (3), the ordinary energy and momentum conservation relations of (1) become:

$$\omega_3(k_1 + k_2) = \omega_1(k_1) + \omega_2(k_2) \tag{4}$$

with $$k_j(\omega_j) = \pm \frac{\omega_j}{c} \sqrt{\frac{|(\omega_j^2 - \omega_a^2)(\omega_j^2 - \omega_b^2)|}{|(\omega_j^2 - \omega_o^2)(\omega_j^2 - \Omega^2)|}}. \tag{5}$$

Here, "c" is the velocity of light; $\omega_j$ is $\omega_1$, $\omega_2$, or $\omega_3$; and $k_j$ is $k_1$, $k_2$, or $k_3$. In the solutions, the momenta $k_1$, $k_2$, and $k_3$ are collinear or anti-collinear, and each wave number "$k_j$" is defined as the amplitude of the associated momentum vector $k_j$ along the direction of the momenta $k_1$, $k_2$, or $k_3$. From the measured values of $\omega_a$, $\omega_b$, $\omega_o$, and $\Omega$, the relations of (4) and (5) can be readily solved graphically and/or numerically to find pairs of input and pump wave numbers, i.e., $(k_1, k_2)$ pairs, and associated pairs of input and pump frequencies, i.e., $(\omega_1, \omega_2)$ pairs, in the optical conversion medium.

The one or more pairs of input and pump frequencies that are found at step 34 are pairs of light operating frequencies for the optical wavelength-converters being calibrated, e.g., the optical wavelength-converters 10A-10D of FIGS. 1A-1D. In the solutions, the relative directions of the collinear momenta $k_1$, $k_2$, and $k_3$ determine the geometry of the optical wavelength-converters. Here, the geometry is determined by the relative directions of the input, light, pump light, and wavelength-converted light in the optical conversion medium, e.g., the optical conversion media or waveguides 12 of FIGS. 1A-1D.

The inventors numerically solved the ordinary energy and momentum conservation of relations of (4) and (5) for an illustrative set of characteristic and resonant frequencies, i.e., $\omega_a$, $\omega_b$, $\omega_o$, and $\Omega$, for which $\omega_a > \omega_b > \omega_o > \Omega$. For the illustrative set, the wave numbers $k(\omega)$ of the input, pump and wavelength-converted light lie along an upper branch, a lower branch, or a negative branch of the dispersion relation illustrated in FIG. 3. In this dispersion relation, the upper and lower branches correspond to regions of positive refractive index, and the negative branch corresponds to a region of negative refractive index, i.e., a metamaterial branch.

FIGS. 4A-4E plot pairs of frequencies, i.e., $(\omega_2, \omega_2)$ pairs, that solve the ordinary energy and momentum conservation relations of (4) and (5) for various geometries for optical wavelength converters. The various solutions correspond to an illustrative optical conversion medium in which $\omega_a = 1.0$, $\omega_b = 0.9$, $\omega_o = 0.4$, and $\Omega = 0.3$.

Figure 3:
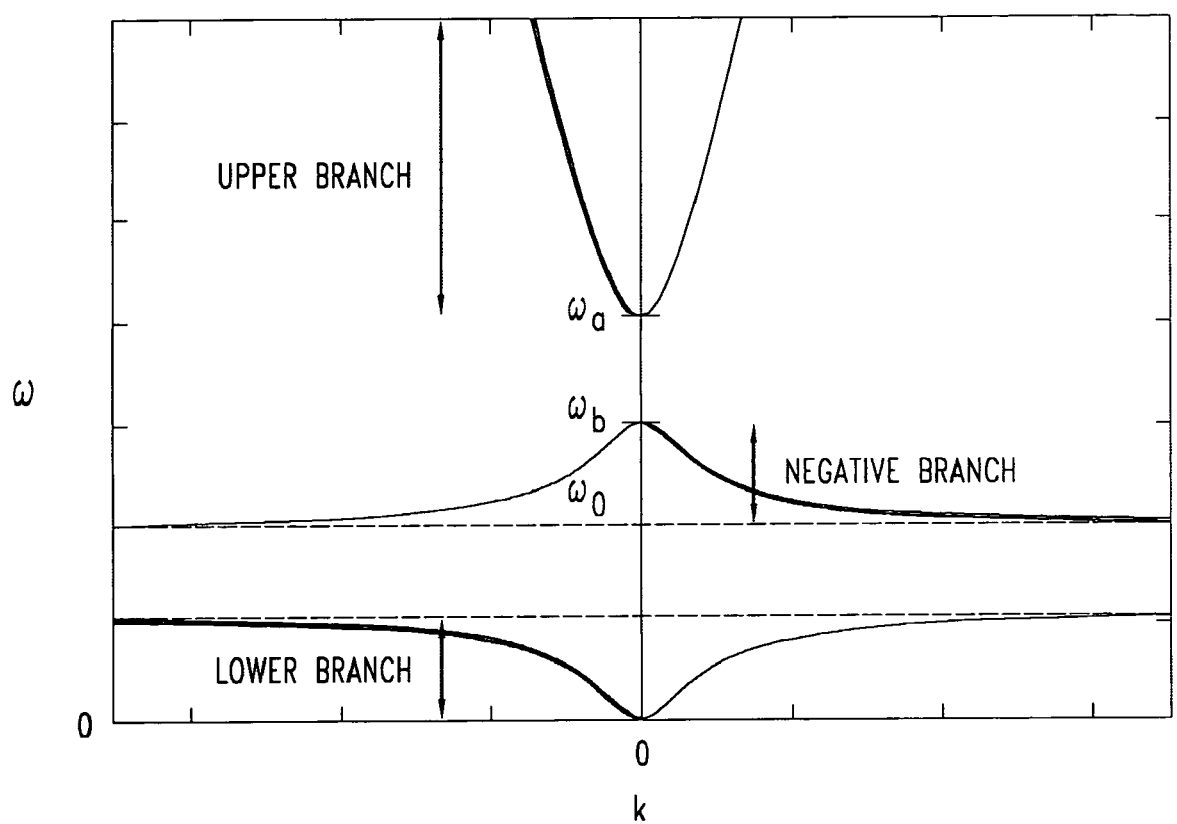
FIG. 3 shows a dispersion relationship between wavenumber and frequency in an illustrative optical medium that behaves as a metamaterial over some frequency range.
Figure 4A:
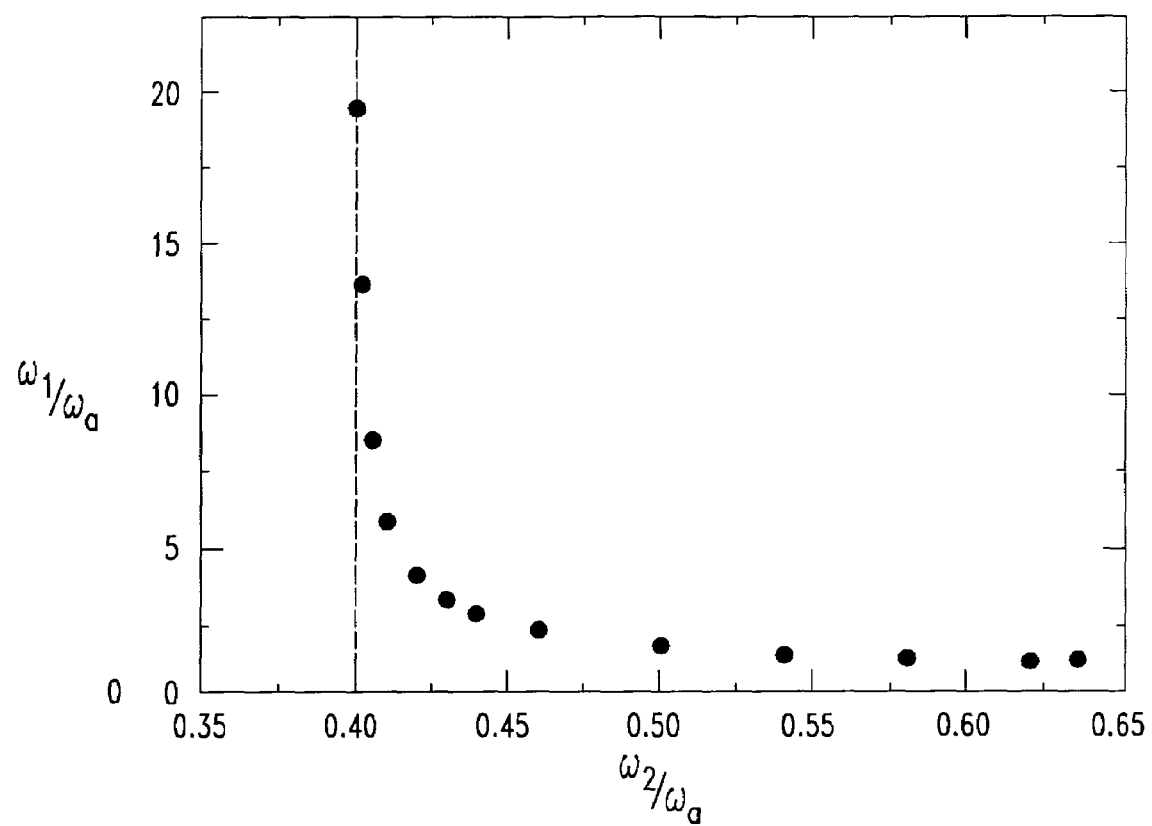
FIGS. 4A-4E plot relations between frequencies of input light and pump light that satisfy ordinary energy and momentum conservation relations in the optical medium of FIG. 3.

FIG. 4A plots input and pump frequency pairs for solutions where the wavelength-converted light and one of the input light and pump light are on the upper branch of FIG. 3. The other of the input light and the pump light is on the negative or metamaterial branch of FIG. 3. In these solutions, the input light and pump light co-propagate, and the wavelength-converted light counter propagates with respect to the input and pump light, e.g., as in the wavelength-converter 10B of FIG. 1B.

Figure 4B:
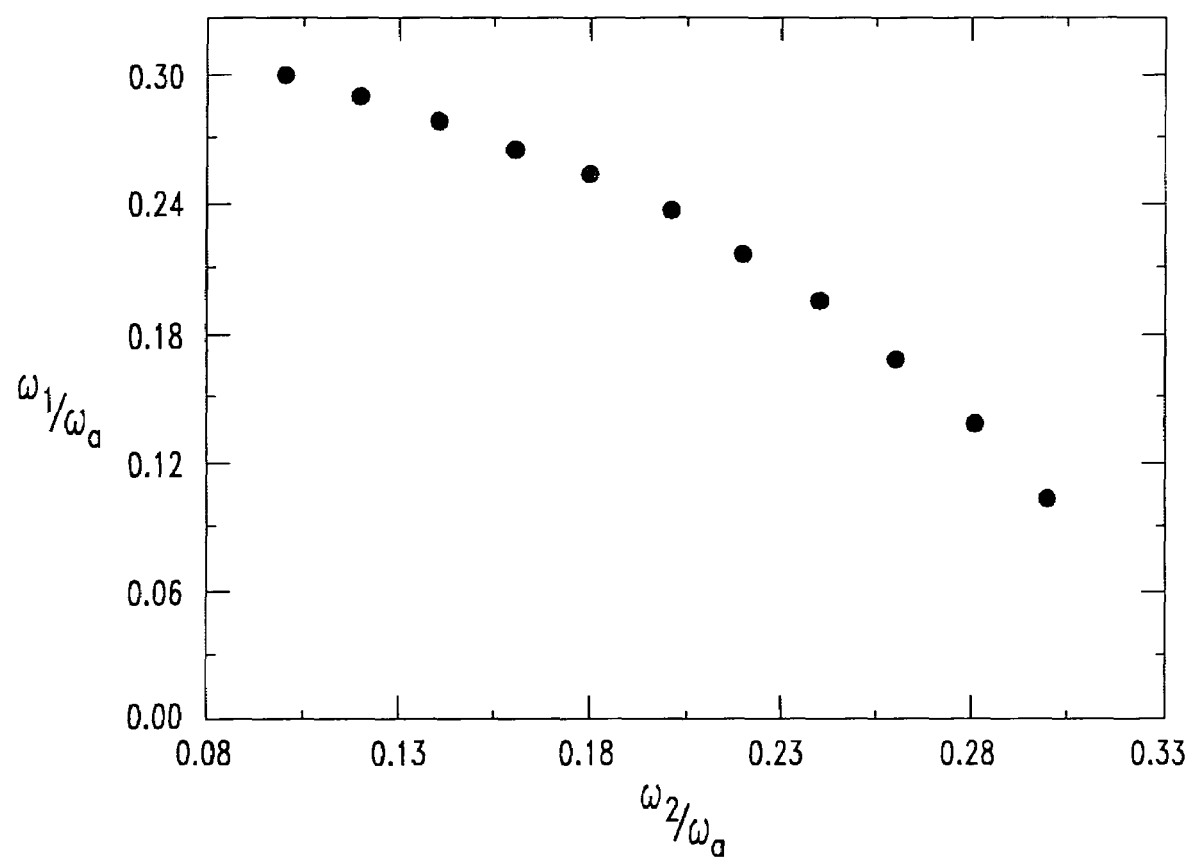

FIG. 4B plots solutions in which the input light and pump are on the lower branch of FIG. 3, and the wavelength-converted light is on the negative or metamaterial branch of FIG. 3. In these solutions, the input light and pump light co-propagate, and the wavelength-converted light counter propagates with respect to the input and pump light, e.g., as in the wavelength-converter 10B of FIG. 1B.

Figure 4C:
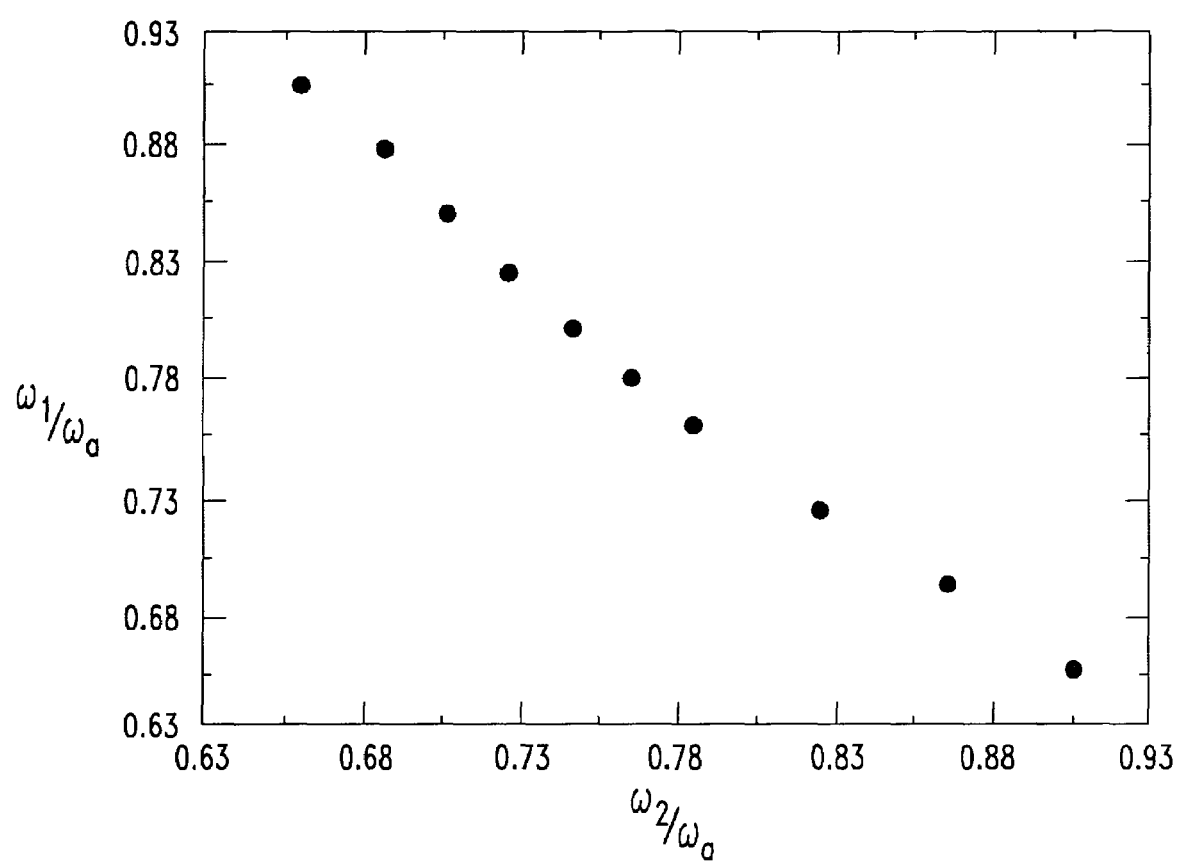

FIG. 4C plots solutions in which the input light and pump light are on the negative branch of FIG. 3, i.e., the metamaterial branch, and the wavelength-converted light is on the upper branch of FIG. 3. In these solutions, the input light and pump light co-propagate, and the wavelength-converted light counter propagates with respect to the input and pump light, e.g., as in the wavelength-converter 10B of FIG. 1B.

Figure 4D:
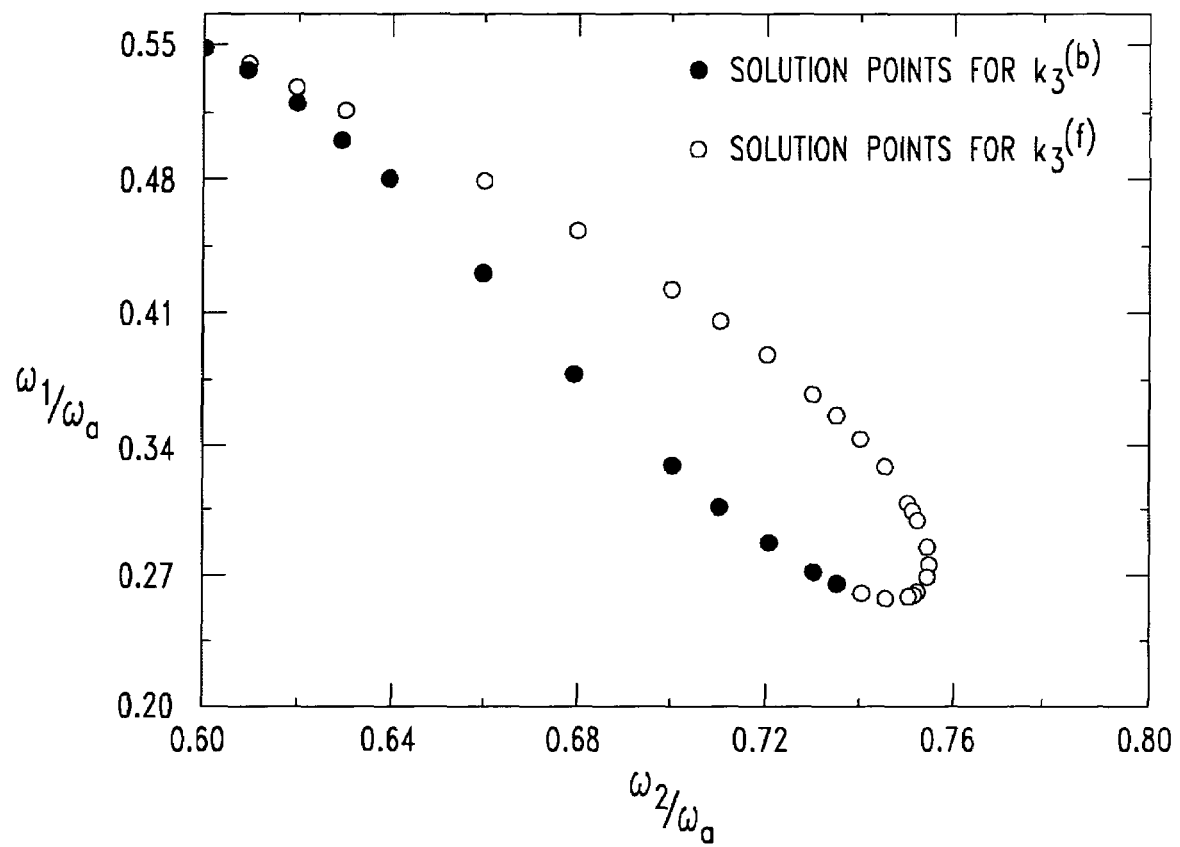

FIG. 4D plots $k_3^{(b)}$ and $k_3^{(f)}$ solutions in which one of the input light and pump light is on the lower branch of FIG. 3, and the other of the input light and pump light is on the negative or metamaterial branch of FIG. 3. The wavelength-converted light is on the upper branch of FIG. 3. In the $k_3^{(b)}$ and $k_3^{(f)}$ solutions, the input light and pump light co-propagate. In the $k_3^{(b)}$ solutions, which are shown as solid data circles, the wavelength-converted light counter propagates with respect to the input and pump light, e.g., as in the wavelength-converter 10B of FIG. 1B. In the $k_3^{(f)}$ solutions, which are shown as empty data circles, the wavelength-converted light co-propagates with respect to the input and pump light, e.g., as in the wavelength-converter 10A of FIG. 1A.

Figure 4E:
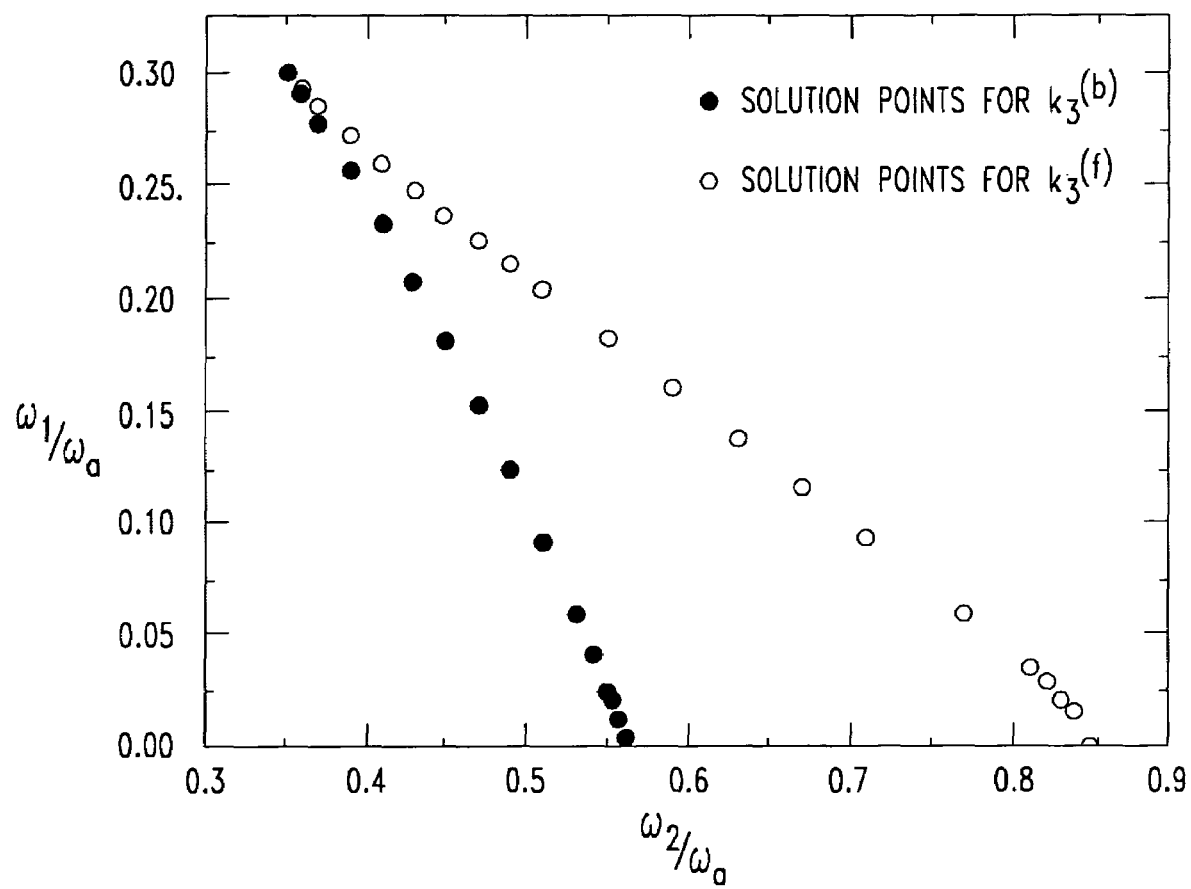

FIG. 4E plots $k_3^{(b)}$ and $k_3^{(f)}$ solutions in which the wavelength-converted light and one of the input light and pump light are on the negative or metamaterial branch of FIG. 3, and the other of the input light and the pump light is on the lower branch of FIG. 3. In these $k_3^{(b)}$ and $k_3^{(f)}$ solutions, the input light and pump light co-propagate. In the $k_3^{(b)}$ solutions, which are shown as solid data circles, the wavelength-converted light counter propagates with respect to the other light, e.g., as in the wavelength-converter 10B of FIG. 1B. In the $k_3^{(f)}$ solutions, which are shown as empty data circles, the wavelength-converted light co-propagates with respect to the other light, e.g., as in the wavelength-converter 10A of FIG. 1A.

Figure 5:
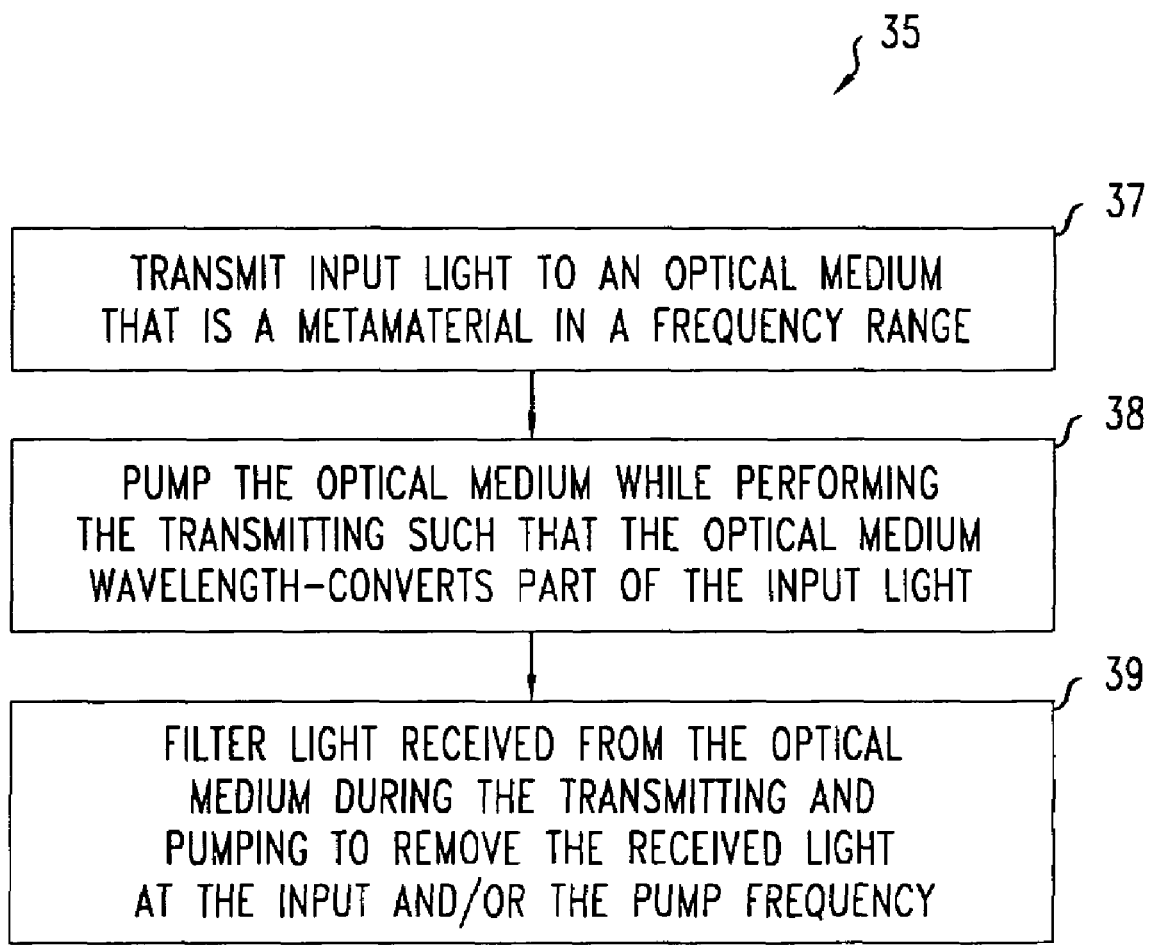
FIG. 5 is a flow chart illustrating a method of performing wavelength conversion, e.g., in optical wavelength-converters of FIGS. 1A-1D.

FIG. 5 illustrates a method 35 for wavelength-converting light of a selected frequency in a substantially homogeneous optical conversion medium, e.g., the optical conversion media or waveguides 12 of some embodiments of the optical wavelength-converters 10A-10D of FIGS. 1A, 1B, 1C, and 1D. The optical conversion medium may be located, e.g., in an optical core and/or optical cladding of the optical conversion waveguides 12 of other embodiments of the optical wavelength-converters 10A-10D of FIGS. 1A, 1B, 1C, and 1D.

The method 35 includes transmitting input light with the selected frequency to an optical conversion medium, e.g., the optical conversion media 12 of FIGS. 1A-1D (step 37). The optical conversion medium may be located in an optical waveguide, e.g., an optical core and/or optical cladding of the optical waveguide, as in the optical conversion waveguides 12 of FIGS. 1A-1D.

The method 35 includes pumping the optical conversion medium while transmitting the input light thereto such that the optical conversion medium wavelength-converts part of the received input light (step 38). In the step 38, the wavelength-conversion is performed by a nonlinear optical process that maintains ordinary energy and momentum conservation relations between the input, pump, and wavelength-converted light in the optical conversion medium. The process involves, e.g., optical 3-wave mixing in the optical conversion medium. The process also maintains, e.g., perfect phase matching conditions between the momenta of the input, pump, and wavelength-converted light in the optical conversion medium. That is, the frequencies and momenta of the input, pump, and wavelength-converted light satisfy, e.g., the relations of (1), or the frequencies and momenta of the input and pump light satisfy, e.g., the relations of (4) and (5) inside the optical conversion medium. The nonlinear optical process maintains the ordinary energy and momentum conservation relations, in part, because the optical medium behaves as a metamaterial at the frequency of the input light, the pump light and/or the wavelength-converted outputted.

The method 35 may further include optically filtering light received from the optical conversion medium during the transmitting and pumping (step 39). The optical filtering is performed to remove light at the input frequency and/or the pump frequency so that substantially only light at the wavelength-converted-frequency is outputted.

2. Correction of Distortions Due to Nonlinear Optical Effects

With respect to exploiting nonlinear optical properties of metamaterials, some other embodiments can partially correct cumulative dispersion and/or cumulative distortions of optical data streams caused by nonlinear optical effects. These embodiments also rely on the fact that an optical medium behaves as a metamaterial in a suitable frequency range.

Figure 6A:
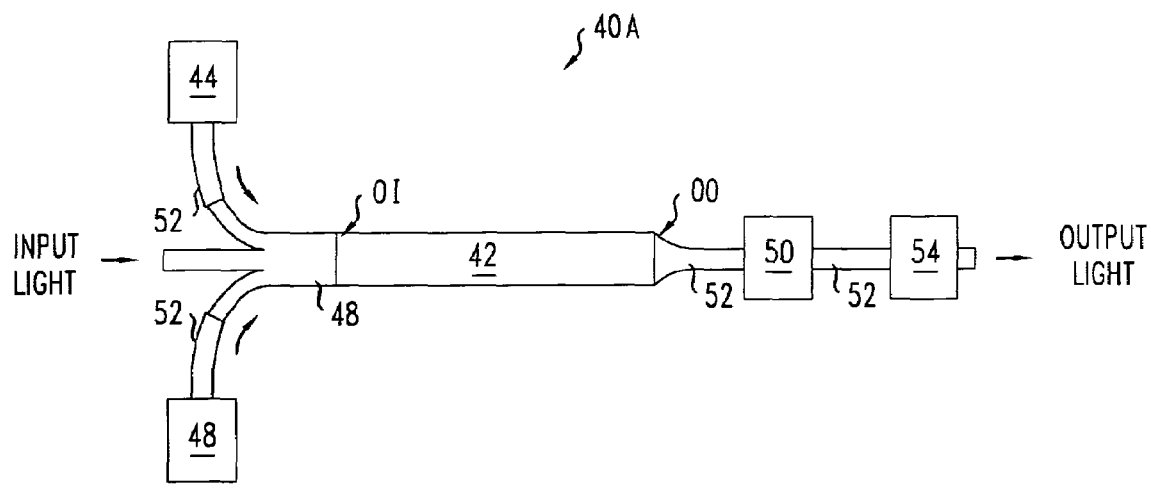
FIGS. 6A and 6B are block diagrams for embodiments of apparatus able to partially correct cumulative dispersion and/or partially correct cumulative signal distortions caused by nonlinear optical effects during transmission of a stream of optical data signals.
Figure 6B:
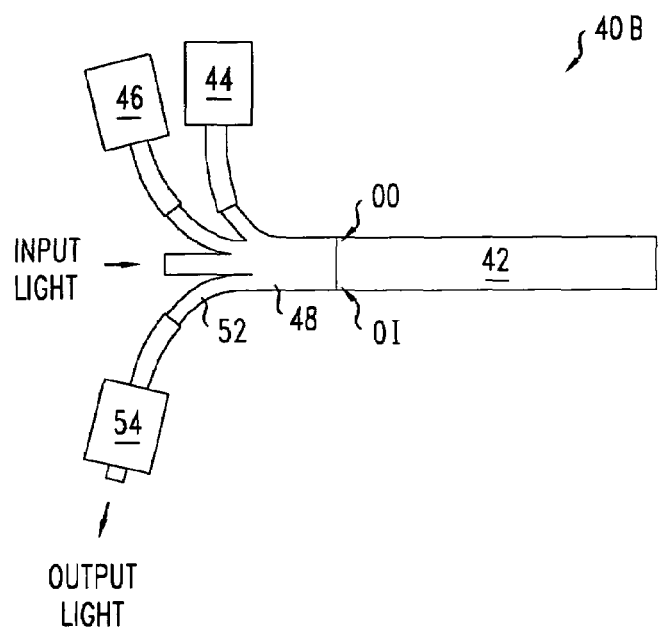

FIGS. 6A and 6B show in-line apparatus 40A and 40B that are capable of partially correcting the dispersion of the optical signals of a data stream and/or partially correcting the distortions of the optical signals that are caused by nonlinear optical effects. The dispersion and distortions may cumulate, e.g., as the optical signals pass through a sequence of spans in an optical fiber transmission line.

The apparatus 40A and 40B include an optical correction medium or waveguide 42 and a first optical pump 44 and may include a second optical pump source 46, a 3×1 or 4×1 optical coupler 48, an optical filter 50, one or more optical waveguides 52, and an optical wavelength-converter 54.

The 3×1 and 4×1 optical couplers 48 are configured to receive the input data stream of optical signals on a first port and is connected to receive pump light from the first and second optical pump sources 44, 46 on its second and third ports. The 3×1 or 4×1 optical coupler 48 is configured to deliver all or part of the light received on the first, second, and third ports to the fourth port, which is connected to the optical correction waveguide 42. Exemplary 3×1 or 4×1 optical couplers 48 may be constructed as integrated planar optical devices or as fiber optical devices with micro-electronics and integrated optics construction techniques that are well-known to those of skill in the art.

The 4×1 optical coupler 48 of the apparatus 40B is also configured to output light received on the fourth port, i.e., from the optical correction medium 42 or optical correction waveguide 42, to a fifth port. The fifth port outputs a partially dispersion and/or distortion corrected data stream of optical signals and may connect via the shown optical waveguide 52 to the optional optical wavelength-converter 54.

The optical correction medium or waveguide 42 receives the data stream of optical data signals and the pump light at its optical input via one or more optical couplers and outputs a corrected data stream of optical data signals at its optical output via an optical coupler. In particular, the optical correction medium 42 or optical correction waveguide 42 may both adjust the cumulative dispersion of the received optical signals and partially correct the cumulative distortion of the received optical data signals due to nonlinear optical effects. The sizes of such adjustments and corrections are controlled by the intensities of the pump and optical data signal light in the nonlinear optical correction medium or waveguide 42 and by the path length in the optical correction medium or waveguide 42.

The first and second optical pumps 44, 46 produce pump light at the selected frequencies $\omega_2$ and $\omega_3$. The frequencies $\omega_2$ and $\omega_3$ are selected to cause the optical correction medium or waveguide 42 to partially correct cumulative dispersion or nonlinear effects on an optical data stream whose carrier frequency is $\omega_1$. The first and second optical pumps 44, 46 may be, e.g., lasers that are wavelength-tunable at visible or near infrared wavelengths.

In the apparatus 40A, the optional optical filter 50 is configured to filter out light at the first and second pump frequencies and may also filter out light at the input frequency when $\omega_1 \neq \omega_4$. Thus, the optical filter 50 only substantially passes light that is output from the optical correction medium 42 or optical correction waveguide 42 at the wavelength of the corrected data stream. The optical filter 50 may be a conventional band pass, low pass, or high pass filter.

The optional optical wavelength-converter 54 wavelength-converts the light of corrected data stream of optical signals. For example, optical wavelength-converter 54 may be configured to wavelength-convert the light of the corrected data stream back to the input frequency $\omega_1$ of the data stream that was originally received by the apparatus 40A and 40B. The optical wavelength-converter may include one of the wavelength-converters 10A-10D of FIGS. 1A-1D or may include a conventional optical wavelength-converter. Exemplary conventional optical wavelength-converters include a semiconductor optical amplifier; a periodically-poled lithium niobate optical waveguide; or a polarization poled, compound semiconductor, optical waveguide.

In the apparatus 40A-40B, the nonlinear optical medium of the optical correction medium 42 or optical correction waveguide 42 has a negative third-order nonlinear electrical susceptibility, $\chi^{(3)}$, for a relevant set of frequency arguments. For example, $\chi^{(3)}(\omega_4, \omega_1, \omega_2, \omega_3)$ may be negative in the nonlinear optical medium where $\omega_1$ is the frequency of input light, $\omega_2$ and $\omega_3$ are the frequencies of the pump light, and $\omega_4$ of the light in the corrected optical data stream. The nonlinear optical medium is also a metamaterial at one or more of the frequencies $\omega_1$, $\omega_2$, $\omega_3$, and $\omega_4$.

If the nonlinear optical medium has a centrosymmetric lattice symmetry, near the resonant frequency, $\omega_0$, of the electric permittivity, $\in(\omega)$, the third-order nonlinear electrical susceptibility, $\chi^{(3)}(\omega_4, \omega_1, \omega_2, \omega_3)$, may be approximately written as:

$$\chi^{(3)}(\omega_4,\omega_1,\omega_2,\omega_3)=G/[D(\omega_1)D(\omega_2)D(\omega_3)D(\omega_4)]$$
$$\text{where } D(\omega)=(\omega_0)^2-(\omega)^2. \quad (6)$$

Here, "G" is a positive constant whose value depends on the nonlinear response properties of the nonlinear optical medium. Then, for a suitable wave number and frequency of the input light, i.e., $k(\omega_1)$ and $\omega_1$, and suitable wave numbers and frequencies for the first and second pump light, i.e., $k_2(\omega_2)$, $k_3(\omega_3)$, $\omega_2$, and $\omega_3$, the nonlinear optical medium is able to produce light at a frequency $\omega_4$ and a wave number $k_4(\omega_4)$ that satisfy the ordinary energy and momentum conservation relations:

$$\omega_4=\pm\omega_1\pm\omega_2\pm\omega_3 \text{ and } k_4(\omega_4)=\pm k_1(\omega_1)\pm k_2(\omega_2)\pm k_3(\omega_3). \quad (7a)$$

Here, the choices of "+" signs and "−" signs determine relative propagation directions of the various types of light in the optical medium as is well known by those of skill in the art. By convention, $\omega_4$ is taken to be positive. Here, the wave number of each type of light is defined by:

$$k_j(\omega_j) = \pm \frac{\omega_j}{c} \sqrt{\frac{|(\omega_j^2 - \omega_a^2)(\omega_j^2 - \omega_b^2)|}{|(\omega_j^2 - \omega_a^2)(\omega_j^2 - \Omega^2)|}}. \quad (7b)$$

where j is 1, 2, 3, or 4. Notably, in the nonlinear optical medium of the optical correction medium or waveguide 42, solutions of the ordinary energy and momentum conservation relations (7a)-(7b) exist for one or more frequency sets $\{\omega_4, \omega_1, \omega_2, \omega_3\}$ for which $\chi^{(3)}(\omega_4, \omega_1, \omega_2, \omega_3)$ is negative. The solutions also impose perfect matching relations among the momenta $k_4(\omega_4)$, $k_1(\omega_1)$, $k_2(\omega_2)$, and $k_3(\omega_3)$.

As an illustration, the ordinary energy and momentum conservation relations (7a)-(7b) have an exemplary solution where $\chi^{(3)}$ is negative for electric/magnetic response properties $\omega_0$, $\omega_a$, $\omega_b$, and $\Omega$ whose values are defined by $\omega_0=0.40\omega_a$, $\omega_b=0.9\,\omega_a$, $\Omega=0.3\,\omega_a$. For this illustrative set of response properties, one such solution to the ordinary energy and momentum conservation relations of (7a)-(7b) is given by: $(\omega_1, k_1)=(0.10\omega_a, 0.83\omega_a)$, $(\omega_2, k_2)=(0.15\omega_a, 1.37\omega_a)$, $(\omega_3, k_3)=(0.20\omega_a, 2.22\omega_a)$, $(\omega_4, k_4)=(0.45\omega_a, 4.42\omega_a)$. For the exemplary solution, such a nonlinear optical medium would behave as a normal refractive medium for light at the input frequency, $\omega_1$, and the pump frequencies, i.e., $\omega_2$ and $\omega_3$, and would behave as a metamaterial at the frequency $\omega_4$ of the light of the corrected data stream. For this exemplary solution, the corrected data stream would propagate in the opposite direction as the input and pump light in the optical correction medium 42 or optical correction waveguide 42, i.e., as in FIG. 6B.

For other sets of frequency arguments, i.e., $\{\omega_4, \omega_1, \omega_2, \omega_3\}$, another nonlinear optical medium may have a negative $\chi^{(3)}(\omega_4, \omega_1, \omega_2, \omega_3)$ and also be a metamaterial at one of said frequency arguments. Then, such a nonlinear optical medium may also be able to produce a corrected data stream when incorporated into the optical correction medium or waveguide 42 of FIG. 6A or 6B.

Alternate embodiments of the apparatus 40A, 40B of FIG. 6A or 6B may be able correct for cumulative dispersion and/or cumulative distortions of optical data signals due to nonlinear optical effects without the second optical pump source 46. These alternate embodiments may utilize, e.g., a degenerate 4-wave mixing process in which $\omega_2=\omega_3$. Then, the single optical pump source 44 at the pump frequency $\omega_2$ would produce all pump light for the nonlinear optical process that corrects cumulative dispersion and/or cumulative distortions of optical data signals in the optical correction medium 42 or the optical correction waveguide 42.

Alternate embodiments of apparatus 40A and 40B of FIGS. 6A and 6B may be available for partially correcting the cumulative dispersion and/or the cumulative distortions of the optical signals that are caused by nonlinear optical effects during propagation. The alternate embodiments include the pump light sources 44, 46 and the optical correction medium or waveguide 42 and may optionally include the 3×1 or 4×1 optical coupler 48, the optical filter 50, one or more of the optical waveguides 52 and/or the optical wavelength-converter 54. In the alternate embodiments, the nonlinear optical medium of the optical correction medium or waveguide 42 has a non-centrosymmetric lattice symmetry. In the alternate embodiments, the optical pumping of a nonlinear optical medium may produce from a stream of input optical data signals a corresponding stream of optical data signals that are, at least, partially corrected for cumulative dispersion and/or cumulative signal distortions due to nonlinear optical effects during transmission. For such a nonlinear optical medium, near the resonant frequency, $\omega_0$, of the electric permittivity, $\in(\omega)$, the third-order nonlinear electrical susceptibility, $\chi^{(3)}(\omega_4, \omega_1, \omega_2, \omega_3)$, may be approximately written as:

$$\left[\frac{G'}{[D(\omega_1)D(\omega_2)D(\omega_3)D(\omega_4)]}\right] \left[\frac{1}{D_1(\omega_1 \pm \omega_2)} + \frac{1}{D(\omega_1 \pm \omega_3)} + \frac{1}{D(\omega_2 \pm \omega_3)}\right] \quad (8)$$

Here, G' is a constant, e.g., a positive constant. The value of G' depends on the nonlinear response properties of the nonlinear optical medium. $D(\omega)$ has the form already described. For a suitable carrier frequency, i.e., $\omega_1$, of the optical data signals, suitable frequencies for the pump light sources 44, 46, i.e., $\omega_2$, $\omega_3$, and either a suitable sum or difference of the pump light frequencies or a suitable sum or difference of the input frequency and one pump light frequency, i.e., $(\omega_i \pm \omega_j)$ where (i, j) is (1, 2), (2, 3), or (1, 3), such a nonlinear optical medium may produce light via processes that maintain ordinary energy and momentum conservation relations. That is, the optical correction medium may produce light by a 4-wave mixing process that maintains the ordinary energy and momentum conservation relations:

$$\omega_4 = \pm\omega_1 \pm \omega_2 \pm \omega_3 \text{ and } k_4(\omega_4) = \pm k_1(\omega_1) \pm k_2(\omega_2) \pm k_3(\omega_3) \quad (9)$$

Here, the wave number of each type of light is defined by above relation (7b), and "j" is 1, 2, 3, or 4. In one or more nonlinear optical media with a non-centrosymmetric lattice structure, a solution of the ordinary energy and momentum conservation relations (9) may also exist for one or more sets of frequency arguments $\{\omega_4, \omega_1, \omega_2, \omega_3\}$ for which $\chi^{(3)}(\omega_4, \omega_1, \omega_2, \omega_3)$ is negative and for which the medium behaves as a metamaterial at one of $\omega_4$, $\omega_1$, $\omega_2$, and $\omega_3$. Then, such a nonlinear optical medium can be used for the optical medium 42 or in the optical correction waveguide 42 of the apparatus 40A, 40B of FIG. 6A or 6B.

In alternate apparatus that partially correct cumulative dispersion and/or partially correct cumulative distortions of optical data signals that are due to nonlinear optical effects, the optical medium or waveguide 42 of FIG. 6A or 6B may have non-centrosymmetric material whose $\chi^{(3)}$ is negative when two of its arguments are degenerate. Then, the two pump frequencies may be equal to the degenerate argument of $\chi^{(3)}$, i.e., e.g., $\omega_2=\omega_3$. Such alternate apparatus may have the layout shown in FIG. 6A or 6B except that only one of the optical pump sources 44, 46 is present.

Various embodiments cover apparatus that partially correct cumulative dispersions of optical data signals and/or partially correct cumulative distortions of the optical data signals where the cumulative dispersions or distortions result from the transmission of the optical data signals through a segment of an optical fiber transmission line.

Figure 7:
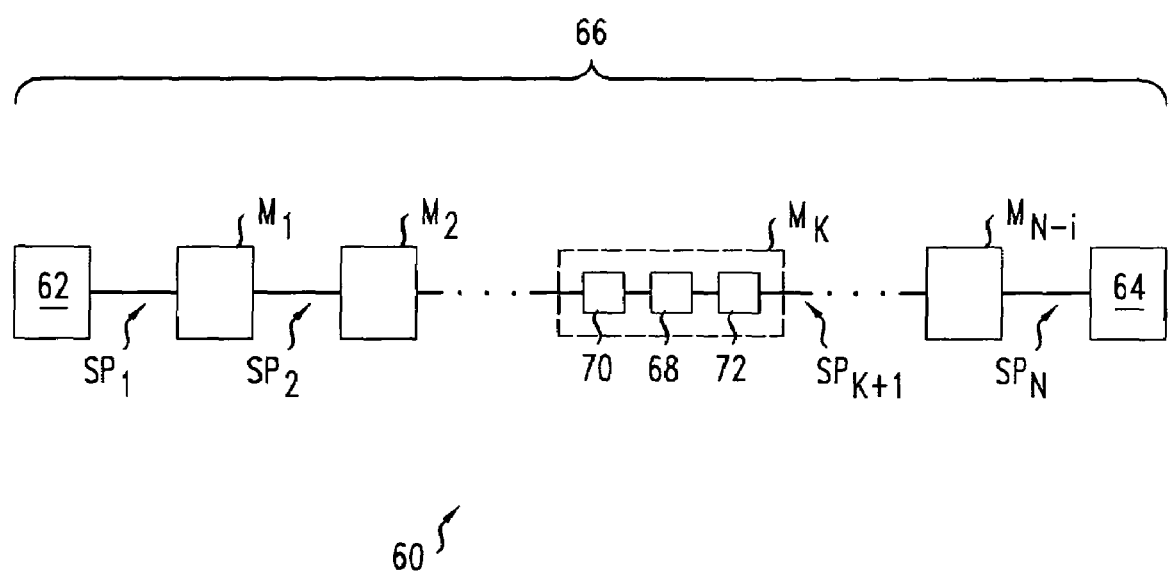
FIG. 7 is a block diagram of an optical fiber transmission line with an in-line apparatus that partially corrects for cumulative optical dispersion and/or partially corrects cumulative signal distortions caused by nonlinear optical effects in the optical fiber transmission line.

FIG. 7 illustrates a portion of an optical fiber communication system 60 that actively corrects distortions that nonlinear optical effects produce in optical data signals during their transmission there through.

The optical fiber communication system 60 includes an optical transmitter 62, an optical receiver 64, and an optical fiber transmission line 66 that carries the optical data signals between the optical transmitter 62 and the optical receiver 64. The optical transmitter 62, receiver 64, and optical fiber transmission line 66 may be configured to communicate a data stream of the optical data signals at near infrared or visible wavelengths, e.g., in the standard telecommunication range between about 1.3 µm and about 1.7 µm.

The optical fiber transmission line 66 includes a series of optical fiber spans $SP_1$, $SP_2$, . . . , $SP_{k+1}$, . . . , $SP_N$ and all-optical modules $M_1$, $M_2$, . . . , $M_k$, . . . , $M_{N-1}$, which connect adjacent ones of the optical fiber spans $SP_1$-$SP_N$. The optical fiber spans $SP_1$-$SP_N$ may be, e.g., segments of standard single-mode optical fiber, i.e., single mode at conventional telecommunications wavelengths. The in-line all-optical modules $M_1$-$M_{N-1}$ may include conventional optical amplifiers 68, e.g., erbium doped fiber amplifiers, and/or conventional optical dispersion compensators 70, e.g., lengths of dispersion compensating optical fiber. Thus, the in-line all-optical modules $M_1$-$M_{N-1}$ may manage both the optical power levels and the cumulative dispersions of the transmitted optical data signals along the optical spans $SP_1$-$SP_N$ of the optical fiber transmission line 66.

One or more of the in-line all-optical modules $M_1$-$M_{N-1}$ also includes a lumped in-line device 72 that, at least, partially, corrects the cumulative signal distortions caused by nonlinear optical effects in the optical fiber transmission line 66. For example, the lumped in-line device 72 may be apparatus 40A or apparatus 40B of FIG. 6A or 6B. Indeed, the partial correction of such cumulative distortion from nonlinear optical effects may enable the optical fiber transmission line 66 to have a longer reach than would otherwise be possible in the absence of the one or more in-line devices 72.

Figure 8:
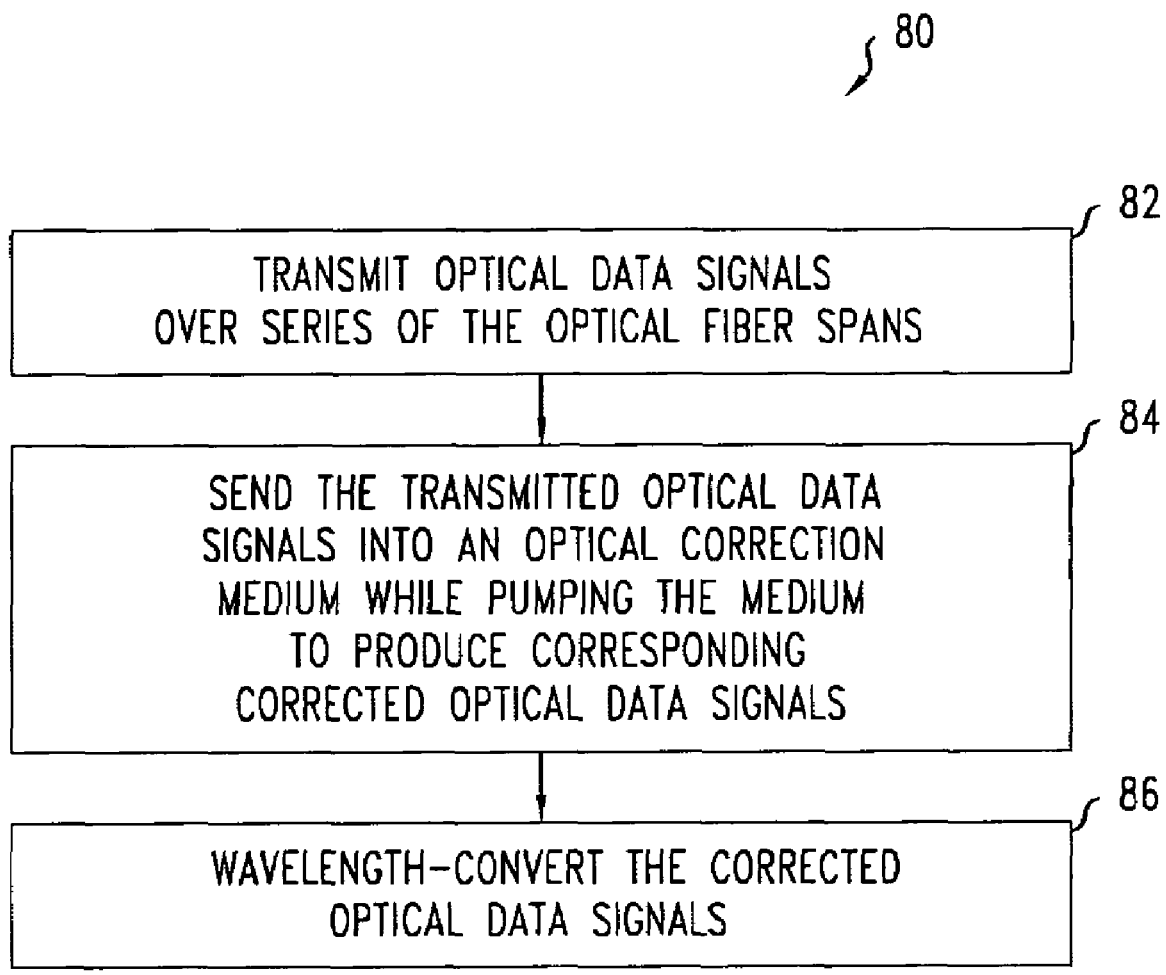
FIG. 8 is a flow chart for a method that partially corrects cumulative optical dispersion and/or partially corrects cumulative distortions of optical signals caused by nonlinear optical effects during transmission of the stream through an optical fiber transmission line.

FIG. 8 illustrates a method 80 of transmitting a stream of optical data signals over a multi-span, optical fiber, communication system, e.g., the optical fiber communication system 60 of FIG. 7. The method 80 includes performing active correction of the distortions that nonlinear optical effects cause to the optical data signals during their transmission through part of an optical fiber transmission line, e.g., the optical fiber transmission line 66 of FIG. 7.

The method 80 includes transmitting a stream of optical data signals over a series of the optical fiber spans of the optical fiber transmission line (step 82). The multiple spans are, e.g., a contiguous subset of the optical fiber transmission spans $SP_1$-$SP_N$ of FIG. 7.

The method 80 also includes sending the transmitted optical data signals into an optical correction medium while optically pumping the optical correction medium (step 84). For the applied optical pumping, the step of sending the optical data signals through the optical correction medium produces corrected optical data signals. That is, the optical correction medium generates from each input optical data signal a corresponding corrected optical data signal. The optical correction medium may be, e.g., the optical correction medium 42 or the optical correction waveguide 42 of FIG. 6A or 6B. The optical correction medium may have a third-order nonlinear electrical susceptibility that is negative for frequency arguments associated with the carrier frequency of the optical data signals, the frequency or frequencies of the pump light, and the carrier frequency of the corrected optical data signals. The optical correction medium is a metamaterial in some wavelength range, e.g., a near infrared or visible wavelength range.

The steps of sending typically produce a stream of corrected optical data signals that has a different carrier frequency than the transmitted optical data signals. For that reason, the method 80 may optionally include wavelength-converting the corrected optical data signals (step 86). For example, the step of wavelength-converting may produce a new stream of corrected optical data signals at the same carrier frequency as the original transmitted optical data signals. After the wavelength-conversion, the corrected optical data signals may be transmitted to a remaining portion of the same optical fiber transmission line that caused the distortions of the optical data signals.

3. Exemplary Optical Media with Negative Refractive Indexes

"Negative index of refraction in optical metamaterials" by Vladimir M. Shalaev et al, Optics Letters, Vol. 30, No. 24 (2005) pages 3356-3358 (Herein referred to as the Shalaev article.) describes an optical medium that is suggested as having a negative refractive index for wavelengths between about 1.3 µm and about 1.6 µm. The Shalaev article is incorporated by reference herein in its entirety. From the teachings of the Shalaev article and the above teachings of this application, one of skill in the art would be able to fabricate without performing undue experimentation nonlinear optical media for the optical conversion media and waveguides 12 of FIGS. 1A-1D and the optical correction media and waveguides 42 of FIGS. 6A and 6B.

Figure 9:
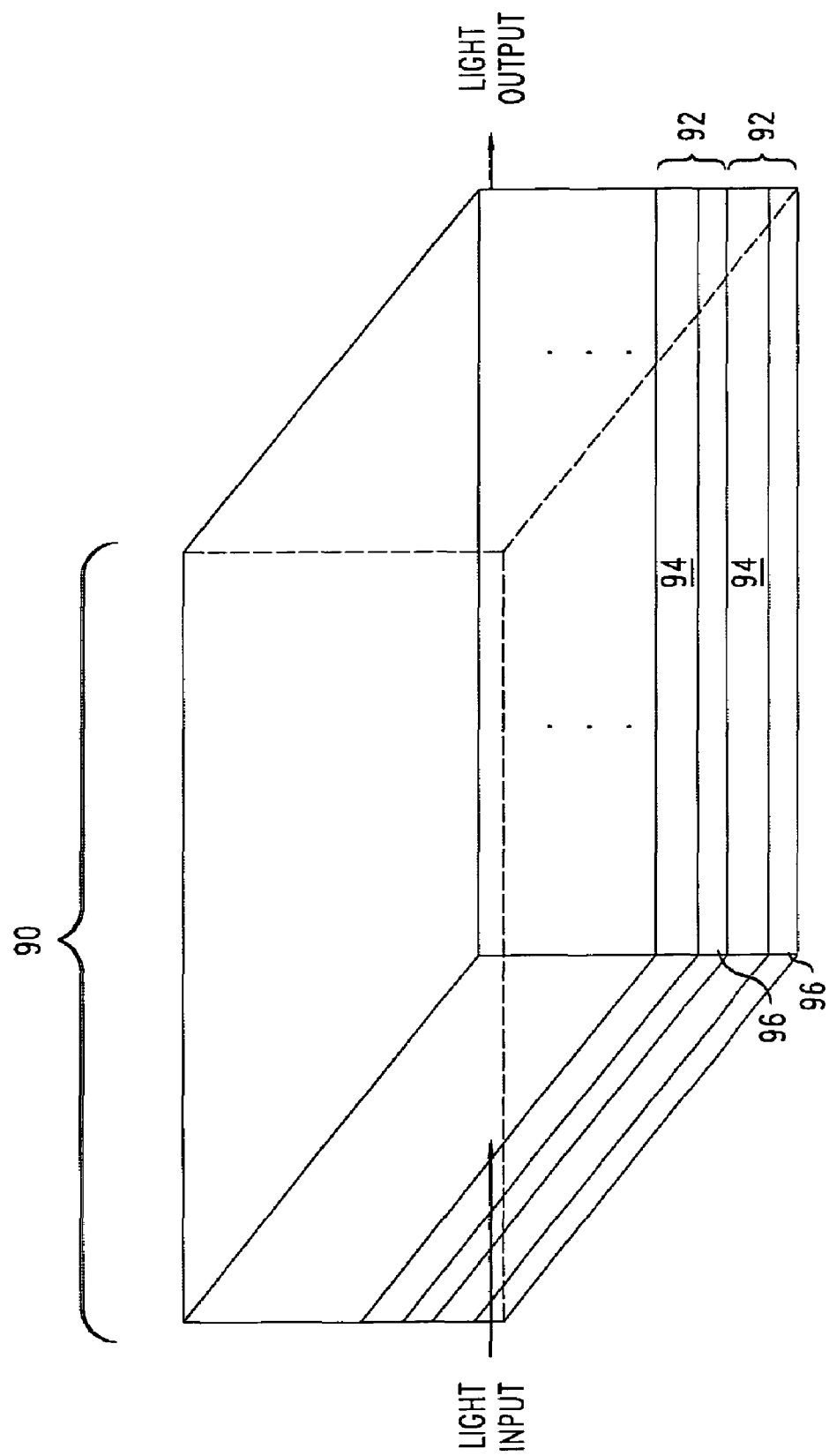
FIG. 9 is an oblique view of an artificial optical medium that may behave as a metamaterial at infrared or visible wavelengths.

FIG. 9 illustrates an exemplary construction for an optical medium 90 that may behave as a negative refractive index material at infrared or visible wavelengths. Such optical media may form, e.g., the optical cores and/or optical cladding of the optical conversion media or waveguides 12 of FIGS. 1A-1D and/or the optical correction media or waveguides 42 of FIGS. 6A and 6B.

The optical medium 90 includes a stack of substantially identical layers 92. Each layer 92 includes a regular two-dimensional (2D) planar array 96 of metallic structures and may include a transparent planar dielectric layer 94. Each 2D array may function, e.g., as an optical LC circuit. In the stack, the different layers 92 are aligned so that the medium has a periodic three-dimensional lattice symmetry, i.e., a centrosymmetric lattice symmetry or a non-centrosymmetric lattice symmetry. The optical medium 90 has a negative refractive index in a wavelength range. The range may include infrared or visible wavelengths, e.g., wavelengths for standard optical fiber communications.

Figure 10:
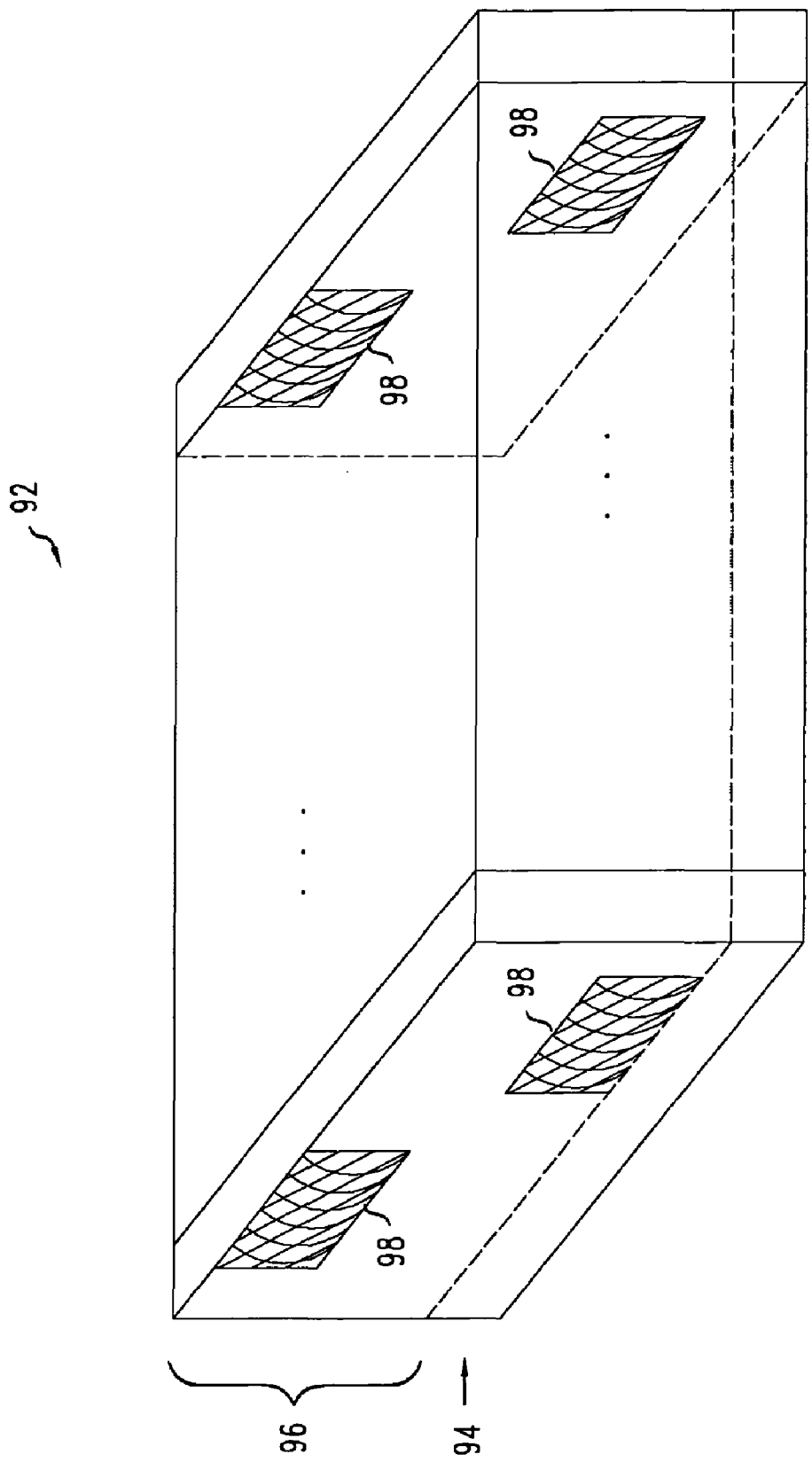
FIG. 10 is an oblique view of one layer of the artificial optical medium of FIG. 9.

FIG. 10 is an oblique top view of one layer 92 in the optical medium 90. In each layer 92, the exemplary 2D planar array 96 is formed of rectangular unit cells where each unit cell has two rectangular metallic structures 98, e.g., capacitive and inductive structures. The rectangular metallic structures 98 are located at two diagonally-related corners of the vertically-oriented rectangular unit cell. The region of the 2D planar array 96, which is located between the rectangular metallic structures 98 of the unit cell and between the unit cells, may be a positive refractive index optical material such as a silicon oxide, e.g., $SiO_2$, or a silicon nitride, e.g., $Si_3N_4$. The planar dielectric layer 94 may also be formed of a transparent and positive refractive index optical material such as a silicon oxide, e.g., $SiO_2$, or a silicon nitride, e.g., $Si_3N_4$.

In an exemplary optical medium 90, the 2D unit cell may be a thick on-edge rectangle whose length may be about 1800 nanometers (nm) and whose height may be about 640 nm. The unit cell includes two identical metallic rectangular structures 98, e.g., capacitors, located about 60 nm from the ends of the unit cell and about 50 nm from the top and bottom sides of the unit cell. Each metallic rectangular structure 98 has a length of about 780 nm along the length of the 2D unit cell and a height of about 220 nm, e.g., along the width of the layer 96. The metallic rectangular structures may be separated by a distance of about 120 nm between their neighboring ends.

In the exemplary metamaterial, the transparent planar dielectric layers 94 may be layers of a silicon oxide or a silicon nitride and may have thicknesses of less than about 1 micrometer. The dielectric layers 94 may also be absent.

For the exemplary metamaterial, conventional processes may be used for fabricating the stack of layers 92. The arrays of metallic rectangular structures 98 may be formed by conventional electron beam processes or conventional deposition/etching processes. In particular, the processes may form the metallic rectangular structures 98 in a lateral sandwich form. The lateral sandwich form has, e.g., a titanium (Ti)/gold (Au)/Ti region, a laterally adjacent $SiO_2$ or $Si_3N_4$ region with a width of about 50 nm or more, and a laterally adjacent region of Ti/Au and possibly Ti. The silicon oxide or silicon nitride region between the metallic regions may be made, e.g., by conventional plasma enhanced chemical vapor deposition (PECVD) and conventional etching processes. After formation of one or more of the layers 92, a conventional chemical mechanical planarization (CMP) may be performed so that the series of one or more layers 92 is planar and has a planar surface. Such planarization may aid to maintain the planar form in succeeding layers 92.

One of skill in the art would be able to vary feature sizes and compositions of the metallic rectangular structures 98, i.e., capacitive-inductive structures, and other structures in the above-described optical medium without undue experimentation. Such variations may produce optical media whose refractive index and/or third-order nonlinear electrical susceptibility, $\chi^{(3)}$, are negative in a selected wavelength range.

For example, the rectangular metallic structures 98, i.e., inductive-capacitive structures, may be formed of lateral sequence of conducting regions, wherein the sequence includes a metal region, a dielectric region of a material having a high dielectric constant, and another metal region. The dielectric region is sandwiched between the laterally adjacent metal regions, e.g., forming a capacitor. The metal regions may be, e.g., Au or multilayers of Au and Ti. The dielectric region may be formed of one of a variety of dielectrics that have high dielectric constants. Exemplary dielectrics with high dielectric constants may include titanate ($BaTiO_3$), barium strontium titanate, lead titanate ($PbTiO_3$), potassium niobate ($KNbO_3$), lead cobalt tungstate ($Pb(Co_{1/2}W_{1/2})O_3$), lead iron tantalate ($Pb(Fe_{1/2}Ta_{1/2})O_3$), lead magnesium niobate ($Pb(Mg_{1/3}Nb_{2/3})O_3$), lead zinc niobate ($Pb(Zn_{1/3}Nb_{2/3})O_3$), lithium tantalate ($LiTaO_3$), potassium strontium niobate, sodium strontium niobate ($NaSr_2Nb_5O_{15}$), lithium potassium strontium niobate ($LiNaSr_4Nb_{10}O_{30}$), sodium barium niobate ($NaBa_2Ni_5O_{15}$), barium strontium niobate, potassium lithium niobate ($K_3Li_2Nb_5O_{15}$), bismuth titanate ($Bi_4Ti_3O_{12}$), and/or potassium dihydrogen phosphate ($KH_2PO_4$). Since the central dielectric region has a high dielectric constant, such embodiments of the rectangular metallic structures 98 can have the same capacitance as the above-described Ti/Au/Ti/silicon (oxide or nitride)/Ti/Au embodiments even though their central dielectric regions are significantly wider than the silicon (oxide or nitride) regions of the Ti/Au/Ti/silicon (oxide or nitride)/Ti/Au embodiments. The use of the wider central dielectric regions may reduce the cost for fabricating the optical material 90.

From the disclosure, drawings, and claims, other embodiments of the invention will be apparent to those skilled in the art.

What is claimed is:

1. An apparatus, comprising:
    an optical medium that behaves as a negative refractive index material over a frequency range;
    one or more optical couplers being configured to provide first and second optical inputs to the optical medium and to provide an optical output from the optical medium; and
    an optical pump source being coupled by one of the one or more optical couplers to deliver pump light to the optical medium; and
    wherein the medium has a third-order nonlinear electrical susceptibility that is negative for some set of frequency arguments that includes a frequency of the optical pump source.

2. The apparatus of claim 1, further comprising an optical waveguide, the optical medium being located in the optical waveguide.

3. The apparatus of claim 2, further comprising an optical filter coupled by one of the one or more couplers to receive light from the optical waveguide.

4. The apparatus of claim 1, wherein the medium is able to wavelength-convert the part of input light by a process that implements perfect phase matching between the momenta of the input, pump, and wavelength-converted light.

5. The apparatus of claim 3, wherein the optical filter is configured to substantially block the pump light.

6. The apparatus of claim 1, comprising a second optical pump light source coupled by one of the one or more optical couplers to deliver pump light to the optical medium at a different frequency than the first optical pump source, the set of frequency arguments including frequencies of both optical pump sources.

7. The apparatus of claim 1, further comprising an optical filter coupled by one of the one or more couplers to receive light from the optical waveguide, the optical filter being configured to block light from the optical pump source.

8. The apparatus of claim 1, further comprising an all-optical multi-span optical fiber transmission line connected to deliver input light to the optical waveguide via one of the one or more optical couplers.

9. The apparatus of claim 2, wherein the optical medium behaves as a negative refractive index material over an infrared wavelength range or a visible wavelength range.

10. A method, comprising:
    at a carrier frequency, transmitting a stream of optical data signals over multiple optical fiber spans of an optical fiber transmission line;
    sending the transmitted optical data signals into an optical medium while optically pumping the optical medium, the optical medium having a third-order nonlinear electrical susceptibility that is negative for some set of frequency arguments that includes a frequency of the optical pumping and the carrier frequency, the optical medium having a negative refractive index over a wavelength range.

11. The method of claim 10, wherein the sending produces a corrected optical data signal from each transmitted optical data signal, the corrected optical signals having a different carrier frequency than the transmitted optical data signals.

12. The method of 11, comprising wavelength-converting the corrected optical data signals to the carrier frequency of the transmitted optical data signals.

13. The method of claim 10, wherein the sending includes simultaneous pumping the optical waveguide with pump light at two wavelengths; and
    wherein the set of frequency arguments includes frequencies of both wavelengths of pump light.

14. The method of claim 10, wherein the optical medium behaves as a negative refractive index material over an infrared wavelength range or a visible wavelength range.

* * * * *